(12) United States Patent
Kesler et al.

(10) Patent No.: US 8,468,849 B2
(45) Date of Patent: Jun. 25, 2013

(54) DOUBLE METAL SEAL FITTING

(75) Inventors: Eric William Kesler, Northville, MI (US); Fred Georg Schroeder, Grosse Ile, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 684 days.

(21) Appl. No.: 12/718,225

(22) Filed: Mar. 5, 2010

(65) Prior Publication Data

US 2011/0214755 A1  Sep. 8, 2011

(51) Int. Cl.
- *A47F 3/04* (2006.01)
- *F16L 39/00* (2006.01)
- *F16L 3/04* (2006.01)
- *F16L 27/04* (2006.01)
- *F16L 41/00* (2006.01)
- *F16L 17/00* (2006.01)
- *F16L 29/00* (2006.01)
- *F16L 17/06* (2006.01)
- *H02G 15/04* (2006.01)

(52) U.S. Cl.
USPC .... 62/527; 285/124.1; 285/124.2; 285/124.3; 285/124.4; 285/124.5; 285/139.1; 285/139.2; 285/139.3; 285/141.1; 285/205; 285/206; 285/207; 285/208; 285/209; 285/210; 285/336; 277/608; 277/609; 277/616; 251/148

(58) Field of Classification Search
USPC ..... 285/124.1–124.5, 139.1–139.3, 205–210; 251/148; 277/608, 609, 616; 62/527, 324.6, 62/251
See application file for complete search history.

(56) References Cited

U.S. PATENT DOCUMENTS

| | | | |
|---|---|---|---|
| 3,078,110 A | 2/1963 | Starr | |
| 3,215,166 A | 11/1965 | Meinecki | |
| 3,367,682 A | 2/1968 | Meriano | |
| 4,119,335 A | 10/1978 | Rieffle et al. | |
| 4,225,161 A | 9/1980 | Smith | |
| 4,361,331 A | 11/1982 | Kohler | |
| 4,468,054 A * | 8/1984 | Orth | 285/124.3 |
| 4,779,903 A | 10/1988 | Maier et al. | |
| 5,145,219 A | 9/1992 | Babuder | |
| 5,727,304 A | 3/1998 | Eybergen | |
| 6,328,351 B1 | 12/2001 | Kato et al. | |
| 6,386,593 B1 | 5/2002 | Slais et al. | |
| 6,676,167 B2 | 1/2004 | Schroeder et al. | |
| 6,834,893 B2 | 12/2004 | Schroeder et al. | |
| 6,857,638 B2 | 2/2005 | Dupont et al. | |
| 6,869,107 B2 | 3/2005 | Schroeder et al. | |
| 6,893,052 B2 | 5/2005 | Wildermuth et al. | |
| 6,896,298 B2 | 5/2005 | Walterscheid et al. | |
| 6,908,117 B1 | 6/2005 | Pickett, Jr. et al. | |
| 6,969,094 B2 | 11/2005 | Frohling et al. | |
| 8,104,773 B2 * | 1/2012 | Schroeder et al. | 277/608 |

(Continued)

*Primary Examiner* — Frantz Jules
*Assistant Examiner* — Erik Mendoza-Wilkenfel
(74) *Attorney, Agent, or Firm* — Fraser Clemens Martin & Miller LLC; J. Douglas Miller (57) ABSTRACT

A multi-port device such as a thermal expansion valve for an air conditioning system includes a seal structure with a first seal portion and a second seal portion. The first seal portion includes a metal material adapted to provide a primary seal. The second seal portion is attached to a free edge of the first seal portion and adapted to provide a secondary seal. The multi-port device with seal structure militates against leakage during operation of the air conditioning system.

20 Claims, 5 Drawing Sheets

U.S. PATENT DOCUMENTS

| | | | |
|---|---|---|---|
| 2002/0117850 A1* | 8/2002 | Wood et al. | 285/124.1 |
| 2003/0080554 A1* | 5/2003 | Schroeder et al. | 285/125.1 |
| 2005/0023827 A1* | 2/2005 | Walterscheid et al. | 285/124.2 |
| 2005/0023828 A1 | 2/2005 | Takeuchi et al. | |
| 2005/0184513 A1 | 8/2005 | Chisnell | |
| 2009/0008932 A1* | 1/2009 | Schulze et al. | 285/139.2 |

* cited by examiner

DOUBLE METAL SEAL FITTING

FIELD OF THE INVENTION

The invention relates to a multi-port device for a vehicle air condition system and, more particularly, to a thermal expansion valve for the vehicle air conditioning system.

BACKGROUND OF THE INVENTION

It is known to use refrigerants such as R12, R134a, and $CO_2$ in an air conditioning system for a vehicle. However, environmental concerns exist with these refrigerants. As a result, legislation has been passed by various governmental agencies of the United States and the European Union, for example, requiring that the air conditioning system operate with substantially no refrigerant leaks or permeation. Even where R1234yf refrigerant is employed in the air conditioning system, leakage concerns exist due to the flammability of the refrigerant.

A thermal expansion valve (often abbreviated as TXV or TX valve) is a component in refrigeration and air conditioning systems that controls the amount of refrigerant flow into an evaporator. The thermal expansion valve thereby controls the fluid temperature at the outlet of the evaporator. This is accomplished by use of a temperature sensing bulb filled with a gas that causes the thermal expansion valve to open against the spring pressure in the valve body as the temperature of the bulb increases. As the temperature in the evaporator decreases, so does the pressure in the bulb, and therefore, the pressure on the spring, causing the thermal expansion valve to close.

The thermal expansion valve is a key element to a refrigeration or air conditioning cycle. The basic refrigeration cycle consists of four major elements: a compressor; a condenser; a metering device; and an evaporator. As the refrigerant passes through a circuit containing these four elements, air conditioning occurs. The cycle starts when the refrigerant enters the compressor in a low pressure, low temperature, and gaseous form. The refrigerant is compressed by the compressor to a high pressure and high temperature gaseous state. The high pressure and high temperature gas then enters the condenser. The condenser condenses the high pressure and high temperature gas to a high temperature liquid by transferring heat to a lower temperature media, usually ambient air. The high temperature liquid then enters the thermal expansion valve where it undergoes an adiabatic expansion, and results in a low pressure and low temperature liquid suitable for cooling. The low temperature and pressure liquid enters the evaporator where heat is transferred from the ambient air to the refrigerant, causing the refrigerant to boil and return to the low pressure, low temperature, and gaseous form. The low pressure and low temperature gas enters the compressor and the cycle repeats.

The thermal expansion valve, as well as other multi-port devices in the air conditioning system such as a condenser manifold and an in-line tube manifold, typically uses a double fitting with either rubber o-ring seals or rubber gasket seals. However, the rubber seals can leak due to permeation, misassembly and contamination of the sealing surface.

There is a continuing need for a multi-port device such as a thermal expansion valve for use in an air conditioning system, which minimizes a leaking of a fluid such as refrigerant from the air conditioning system.

SUMMARY OF THE INVENTION

In concordance with the instant disclosure, a multi-port device such as a thermal expansion valve for use in an air conditioning system, which minimizes a leaking of a fluid such as refrigerant from the air conditioning system, has surprisingly been discovered.

In one embodiment, a multi-port device for an air conditioning system includes a first tube having a flanged tube end. The flanged tube end includes a first sealing surface with a first sealing bead formed thereon. The multi-port device includes a first collar having a wall with an opening formed therein. The opening receives the flanged tube end of the first tube. The flanged tube end abuts the wall of the first collar. The first collar has an axially extending annular wall surrounding the opening and the flanged tube end. The multi-port device also includes a hollow main body having a first port receiving the first collar and the flanged tube end of the first tube. The first port has a base with an annular groove disposed therein. The annular groove cooperates with the axially extending wall of the first collar. The first port has a second sealing surface with a second sealing bead formed thereon and disposed radially inward from the annular groove. The second sealing surface surrounds an aperture formed in the base of the first port. The multi-port device further includes a first seal structure disposed radially inward from the axially extending wall of the first collar and between the flanged tube end of the first tube and the main body. The first seal structure includes a first seal portion produced from a plastically deformable metal or plastic material and having a free edge. The first seal structure also includes a second seal portion produced from an elastomer disposed on the free edge of the first seal portion. A first end plate receives the first tube and abuts the wall of the first collar opposite the flanged tube end. A first fastener engages the first end plate and the main body. The first fastener causes the first sealing bead of the first tube and the second sealing bead of the first port to plastically deform the first seal portion of the first seal structure and provide a primary seal between the first tube and the first port. The first fastener also causes the first sealing surface of the first tube and the second sealing surface of the first port to cooperate with the second seal portion of the first seal structure and provide a secondary seal between the first tube and the first port. The primary seal and the secondary seal militate against a leakage of a fluid from the multi-port device.

In another embodiment a thermal expansion valve for an air conditioning system includes a plurality of tubes, a plurality of collars, a hollow main body, a plurality of seal structures, a pair of end plates, and a plurality of fasteners. Each of the tubes has a flanged tube end. The flanged tube end includes a first sealing surface with a first sealing bead formed thereon. Each of the collars has a wall with an opening formed therein. The opening receives the flanged tube end of one of the tubes. The flanged tube end abuts the wall of one of the collars. Each of the collars has an axially extending annular wall surrounding the opening and one of the flanged tube ends. The hollow main body includes a plurality of ports. Each of the ports receives one of the collars and the tube end of one of the tubes. The ports each have a base with an annular groove disposed therein. The annular groove cooperates with the axially extending wall of one of the collars. Each of the ports has a second sealing surface with a second sealing bead formed thereon. The second sealing bead is disposed radially inward from the annular groove. The second sealing surface surrounds an aperture formed in the base of the first port. Each of the seal structures is disposed radially inward from the axially extending wall of one of the collars, and between the flanged tube end of the one of the tubes and the main body. Each seal structure includes a first seal portion produced from a plastically deformable metal or plastic material, and has a free edge. Each seal structure also includes a second seal portion produced from an elastomer that is disposed on the free edge of the first seal portion. The main body is disposed between the pair of end plates. Each of the end plates receives at least one of the tubes and abuts the wall of one of the collars opposite the flanged tube end. The fasteners engage the end plates and the main body. The fasteners cause the first sealing beads of the tubes and the second sealing beads of the ports to plastically deform the first seal portions of the seal structures and provide primary seals between the tubes and the ports. The fasteners also cause the first sealing surface of the tubes and the second sealing surface of the first port to cooperate with the second seal portions of the seal structures and provide secondary seals between the tubes and the ports. The primary seals and the secondary seals militate against a leakage of refrigerant from the thermal expansion valve.

In a further embodiment, a thermal expansion valve for an air conditioning system includes a first tube having a flanged tube end, a second tube having a flanged tube end, a third tube having a flanged tube end, and a fourth tube having a flanged tube end. The flanged tube ends each include a first sealing surface with a first sealing bead formed thereon. The first tube is a suction line to a compressor, the second tube is an outlet line from an evaporator, the third tube is a refrigerant inlet line, and the fourth tube is an inlet line to the evaporator. The thermal expansion valve further includes a first collar, a second collar, a third collar, and a fourth collar, each having a wall with an opening formed therein. The opening receives the flanged tube end of the respective first tube, second tube, third tube, and fourth tube. The flanged tube end abuts the wall of the respective first collar, second collar, third collar, and fourth collar. Each of the collars also has an axially extending annular wall surrounding the respective opening and the respective flanged tube end. Each of the first port, the second port, the third port, and the fourth port have a second sealing surface with a second sealing bead formed thereon, and disposed radially inward from the annular groove. The second sealing surface surrounds an aperture formed in the base of each of the first port, the second port, the third port, and the fourth port. Each seal structure is disposed radially inward from the axially extending wall of the respective collar, and between the flanged tube end of the respective tube and the main body. A first end plate receives the first tube and the third tube, and abuts the wall of the first collar opposite the flanged tube end of the first tube and the wall of the third collar opposite the flanged tube end of the third tube. A second end plate receives the second tube and the fourth tube, and abuts the wall of the second collar opposite the flanged tube end of the second tube and the wall of the fourth collar opposite the flanged tube end of the fourth tube. A first fastener engages the first end plate and the main body to cause the first sealing beads of the first tube and the third tube, and the second sealing beads of the first port and the third port, to plastically deform the first seal portions of the first seal structure and the third seal structure and provide primary seals therebetween. The first fastener also causes the first sealing surfaces of the first tube and the third tube, and the second sealing surfaces of the first port and the third port, to cooperate with the second seal portions of the first seal structure and the third seal structure and provide secondary seals therebetween. The second fastener causes the first sealing beads of the second tube and the fourth tube, and the second sealing beads of the second port and the fourth port, to plastically deform the first seal portions of the second seal structure and the fourth seal structure and provide primary seals therebetween. The second fastener also causes the first sealing surfaces of the second tube and the fourth tube, and the second sealing surfaces of the second port and the fourth port, to cooperate with the second seal portions of the second seal structure and the fourth seal structure and provide secondary seals therebetween. The primary seals and the secondary seals militate against a leakage of refrigerant from the thermal expansion valve.

DRAWINGS

The above, as well as other advantages of the present invention, will become readily apparent to those skilled in the art from the following detailed description of the invention when considered in the light of the accompanying drawings in which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
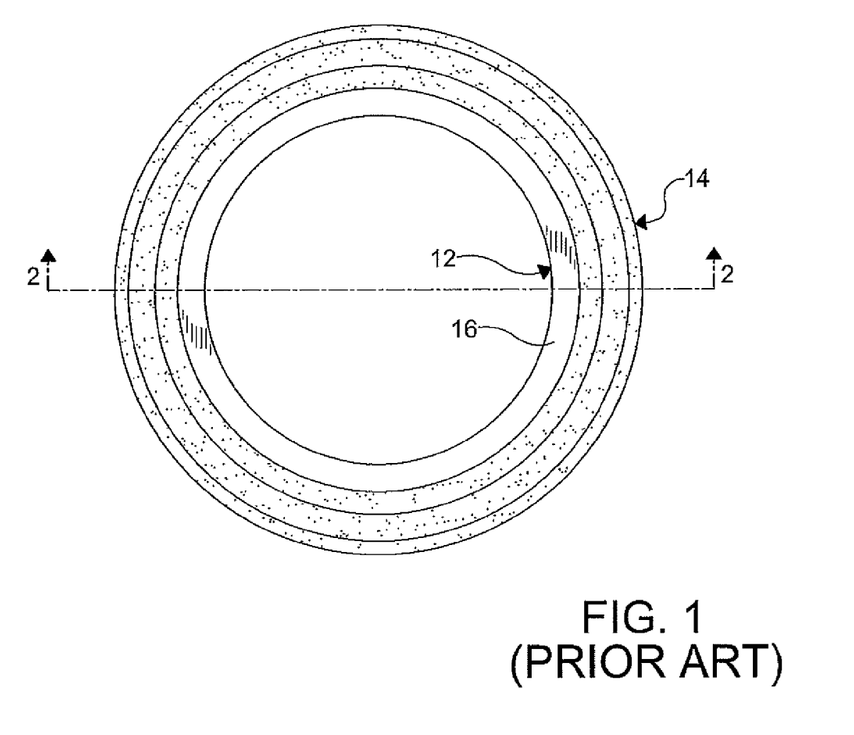
FIG. 1 is a top plan view of a prior art seal structure for use in the thermal expansion valve of the present disclosure.

FIG. 1 shows a seal structure 10 for use with a multi-port device for an air conditioning system. The seal structure 10 is also described in Assignee's U.S. Pat. No. 7,621,568 to Schroeder et al., and U.S. patent application Ser. No. 12/714,821 to Schroeder et al., the entire disclosures of which are hereby incorporated herein by reference. Advantageously, the seal structure 10 exhibits minimal to zero leakage, and is substantially contamination proof.

Figure 2:
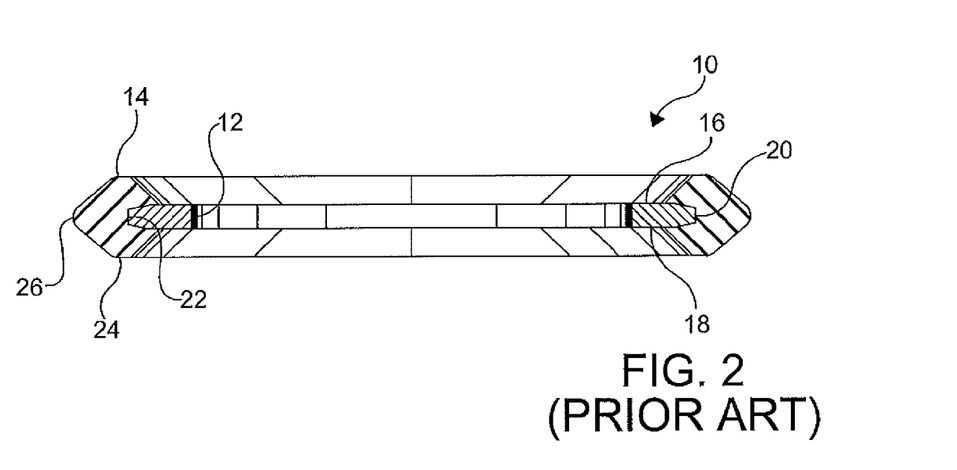
FIG. 2 is a cross-sectional view of the prior art seal structure of FIG. 1 taken along section line 2-2.

The seal structure 10 includes a first seal portion 12 and a second seal portion 14. The first seal portion 12 is a substantially flat annular ring. As illustrated in FIG. 2, the ring has a first surface 16 and a second surface 18. An outer free edge 20 of the first seal portion 12 has a chamfer formed thereon. The chamfer provides additional surface area for bonding between the first seal portion 12 and the second seal portion 14 of the seal structure 10. The chamfer also permits the first seal portion 12 to be disposed further inside of the second seal portion 14 without displacing an undesirable amount of the material forming the second seal portion 14 for purposes of compression. The chamfer also provides a blunt end to the outer free edge 20 that minimizes stresses and cracking that would otherwise result if the outer free edge 20 terminated at a point and the seal structure 10 were compressed radially inward during assembly in the main body fitting of the present disclosure.

It is understood that the outer free edge 20 can be any shape such as substantially square or rounded, for example. It is further understood that the outer free edge 20 can be continuous or scalloped to facilitate retention of the second seal portion 14 on the first seal portion 12. The cross-sectional shape of the first seal portion 12 is substantially rectangular, although other cross-sectional shapes can be used as desired such as triangular, oval, and other radial curves, for example. It is also understood that channels or grooves can be formed in the first surface 16 and the second surface 18 of the first seal portion 12. In the embodiment shown, the first seal portion 12 is produced from a tin-coated copper that has been annealed in a non-hydrogen containing inert gas prior to plating with tin in order to avoid embrittlement. However, it is understood that other conventional materials can be used as desired such as laminated tetrafluoroethylene, rubber-coated aluminum, PEEK, Vespel® high performance polyimide polymer, pewter, babbit, bronze, nickel, polyamide, aluminum, and other metal coated or rubber-coated metals, for example.

In a particular embodiment, the first seal portion 12 is formed from a soft deformable material having a hardness of less than about 40 HR 15T, where "H" stands for hardness, and "R" stands for the Rockwell Hardness and Rockwell Superficial Hardness Test Methods for Metallic Materials as specified in ASTM E 18. The hardness designation code "15T" is a superficial hardness scale which uses a 15 kg load and a 1/16" diameter hardened steel ball for indentation of a test sample. Typical washer materials such as hardened steel and hardened aluminum have hardness values greater than 40 HR 15T, and are therefore not considered in the art to be "soft" materials. One of ordinary skill in the art should understand that materials having a hardness greater than 40 HR 15T are not suitable for use in the seal structure 10 of the invention, which is instead configured to be plastically deformed upon installation of the seal structure 10 under a force, for example, from about 500 lbf/inch to about 1000 lbf/inch of sealing bead circumference, which is applied to sealingly engage the seal structure 10 with the multi-port device for the mobile air conditioning system of the present disclosure.

The second seal portion 14 extends radially outwardly from the outer free edge 20 of the first seal portion 12. An annular channel 22 is formed in a radial inner portion 24 of the second seal portion 14. The annular channel 22 is adapted to receive the outer free edge 20 of the first seal portion 12. The second seal portion 14 is fastened to the first seal portion 12 by any conventional fastening means such as vulcanizing, heat welding, press fitting, an adhesive, or a mechanical means of attachment, for example. A radial outer portion 26 extends radially outwardly from the radial inner portion 24. In the embodiment shown, the second seal portion 14 is produced from an elastomer. It is understood that the second seal portion 14 may be produced from any conventional material such as an ethylene propylene diene monomer (EPDM), fluorocarbon rubber (FKM), chloroprene rubber (CR), acrylonitrile butadiene rubber (NBR), and hydrogenated acrylonitrile butadiene rubber (HNBR), for example.

Referring now to FIGS. 3-7, the present disclosure includes a thermal expansion valve 100 having a plurality of the seal structures 10. The thermal expansion valve 100 includes known internal and external components such as an internal spring, an internal rod, and an external power actuator filled with gas, which are shown in FIGS. 3-5 and 7, but are not critical to the invention of the present disclosure. Additionally, although the embodiments shown and described herein are thermal expansion valves 10, it should be understood that use of the seal structure 10 with other multi-port devices for air conditioning systems, such as condenser manifolds and in-line tube manifolds, is also within the scope of the present disclosure.

Figure 6:
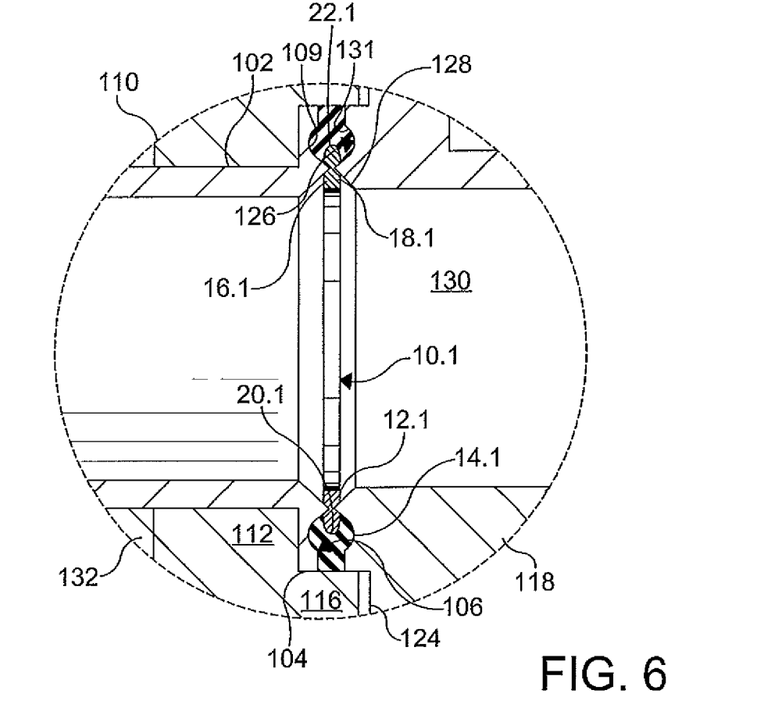
FIG. 6 is an enlarged fragmentary cross-sectional side view of the thermal expansion valve shown in FIG. 5 and identified by circle 6, further illustrating the seal formed by the seal structure.
Figure 7:
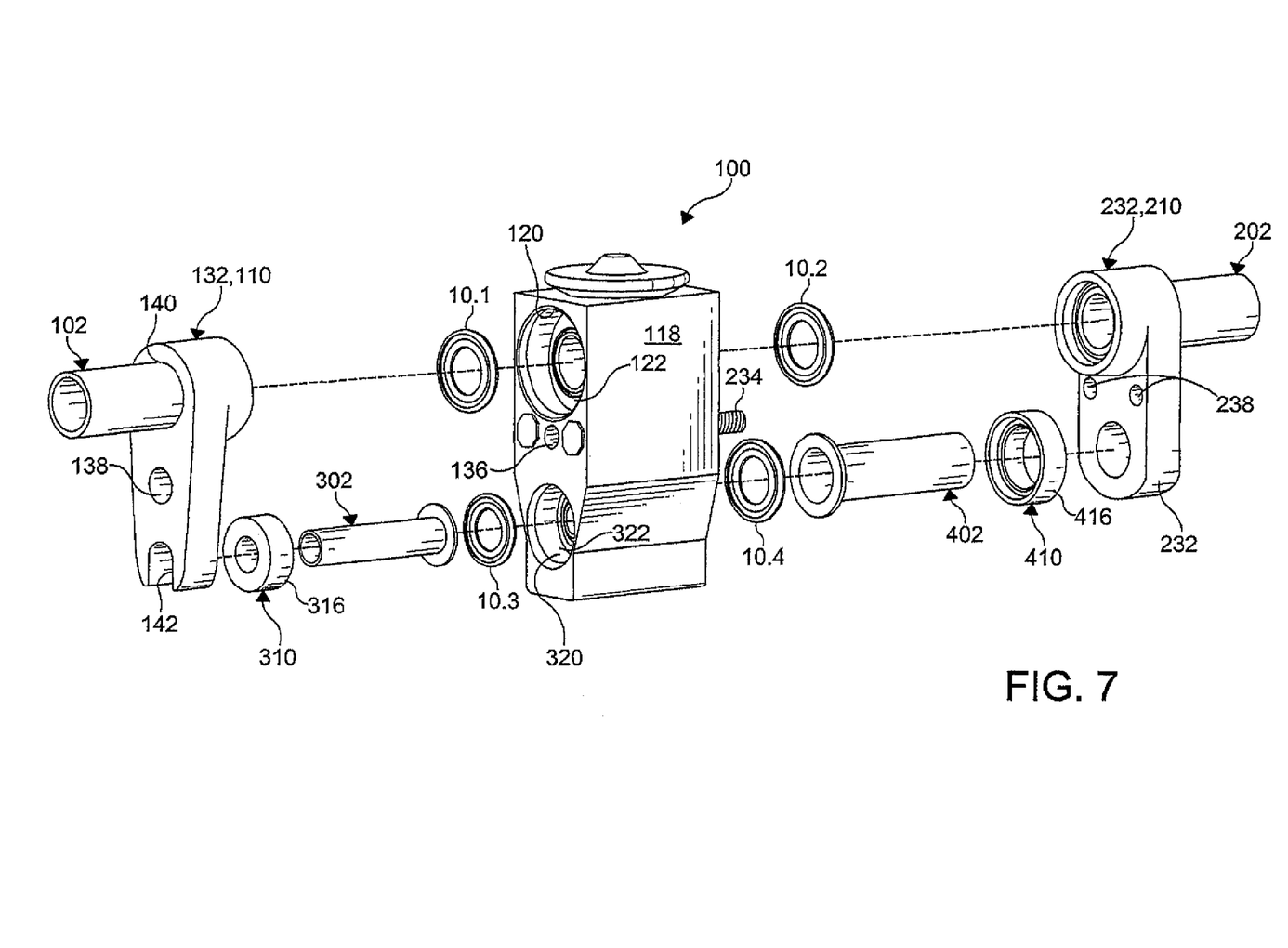
FIG. 7 is an exploded perspective view of a thermal expansion valve with a plurality of the seal structures of FIGS. 1 and 2, according to another embodiment of the present disclosure.

The thermal expansion valve 100 receives a first tube 102 having a flanged tube end 104. The flanged end tube 104 may be folded over by a cold forming process, for example. The flanged tube end 104 has a first sealing surface 106 with a first sealing bead 108 formed thereon. In a particular embodiment, the first sealing surface 106 of the flanged tube end 104 includes an annular channel 109 disposed radially outward from the first sealing bead 108, as shown in FIG. 6. At least one of the first sealing bead 108 and the annular channel 109 may be machined into the first sealing surface 106, although other methods can also be used as desired.

The thermal expansion valve 100 also includes a first collar 110 having an outer wall 112 with an opening 114 formed therein. The opening 114 receives the flanged tube end 104 of the first tube 102. The flanged tube end 104 abuts the wall 112 of the first collar 110. The first collar 110 has an axially extending annular wall 116 surrounding the opening 114 and the flanged tube end 104. It should be appreciated that the flanged end tube 104 may be formed inside of the first collar 110 after the first tube 102 has been disposed through the opening 114.

The thermal expansion valve 100 further includes a hollow main body 118. The hollow main body 118 includes a first port 120 that receives the first collar 110. The first port 120 may include a tapered portion 121 that facilitates a piloting of the first collar 110 into the first port 120 during an assembly of the thermal expansion valve 100. The first port 120 also receives the flanged tube end 104 of the first tube 102. The first port 120 has a base 122 with an annular groove 124 disposed therein. The annular groove 124 receives the axially extending wall 116 of the first collar 110. The first port 120 has a second sealing surface 126 with a second sealing bead 128 formed thereon. The second sealing bead 128 is formed radially inward from the annular groove 124. The second sealing surface 126 surrounds an aperture 130 formed in the base 122 of the first port 120. The aperture 130 opens to a cavity disposed within the hollow main body 118. In a particular embodiment, the second sealing surface 126 of the first port 120 also includes an annular channel 131 disposed radially outward from the second sealing bead 128 as shown in FIG. 6. At least one of the second sealing bead 128 and the annular channel 131 may be machined into the second sealing surface 126.

In one embodiment, each of the first sealing bead 108 and the second sealing bead 128 is substantially V-shaped in cross-section. Each of the first and second sealing beads 108, 128 may also have a tip that is rounded but sufficiently sharp to cut through a contamination at the first seal portion 12 of the seal structure 10. Other suitable cross-sectional shapes for the first sealing bead 108 and the second sealing bead 128 may be employed, as desired.

The thermal expansion valve 100 includes a plurality of the seal structures 10, hereinafter referred to as a first seal structure 10.1, a second seal structure 10.2, a third seal structure 10.3, and a fourth seal structure 10.4. The first, second, third, and fourth seal structures 10.1, 10.2, 10.3, 10.4 respectively include first seal portions 12.1, 12.2, 12.3, 12.4, second seal portions 14.1, 14.2, 14.3, 14.4, first surfaces 16.1, 16.2, 16.3, 16.4, second surfaces 18.1, 18.2, 18.3, 18.4, and outer free edges 20.1, 20.2, 20.3, 20.4, as described hereinabove.

Figure 5:
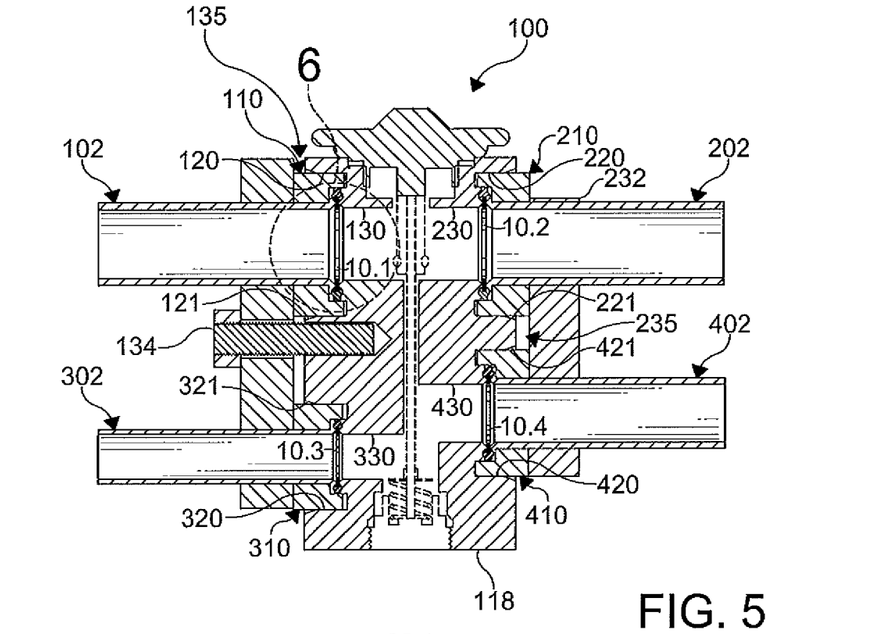
FIG. 5 is an assembled cross-sectional side elevation view of the thermal expansion valve shown in FIG. 4.

The first seal structure 10.1 is disposed radially inward from the axially extending wall 116 of the first collar 110. The first seal structure 10.1 is also disposed between the flanged tube end 104 of the first tube 102 and the main body 118. A first end plate 132 receives the first tube 102. The first end plate 132 abuts the wall 112 of the first collar 110 opposite the flanged tube end 104. A first fastener 134 engages the first end plate 132 and the main body 118. As depicted in FIG. 5, a gap 135 may be present between the main body 118 and the first end plate 132 after the main body 118 and the first end plate 132 are fully engaged.

With reference to FIG. 6, the first fastener 134 causes the first sealing bead 108 of the first tube 102 and the second sealing bead 128 of the first port 120 to plastically deform the first seal portion 12.1 of the first seal structure 10.1. A primary seal is thereby provided between the first tube 102 and the first port 120. In one example, each of the first sealing bead 108 and the second sealing bead 128 impinge the opposing first and second surfaces 16.1, 18.1 of the first seal portion 12.1 of the first seal structure 10.1 to a depth of up to about thirty percent (30%) of a maximum thickness of the first seal portion 12.1. The first and second sealing beads 108, 128 thereby may cut through any contamination such as oil, dirt, hair, paint flakes, and other debris that may undesirably be present at the first seal portion 12.1 of the first seal structure 10.1. The first fastener also causes the first sealing surface 106 of the first tube 102 and the second sealing surface 126 of the first port 120 to cooperate with the second seal portion 14.1 of the first seal structure 10.1. A secondary seal is thereby provided between the first tube 102 and the first port 120. The primary seal and the secondary seal militate against a leakage of a fluid from the thermal expansion valve 100.

In a particular embodiment, the main body 118 has a threaded fastener hole 136, the first end plate 132 has a fastener hole 138, and the first fastener 134 includes a threaded stud and nut. The threaded stud cooperates with the threaded fastener hole 136 in the main body 118. The threaded stud is also disposed through the fastener hole 138 in the first end plate 132. The nut of the first fastener 134 further cooperates with the threaded stud to urge the first end plate 132 toward the main body 118. Alternatively, a bolt can be used. The first end plate 132 may have a tube aperture 140 disposed at one end thereof for receiving the first tube 102. Another tube aperture 142 may be disposed at another end of the first end plate 132. In a particular embodiment, the other tube aperture 142 may be a slot formed at the other end of the first end plate 132. A skilled artisan should appreciate that other configurations of holes and slots for receiving the first tube 102 and other tubes in the first end plate 132 may also be employed.

It should be understood that the multi-port device such as the thermal expansion valve 100 of the present disclosure includes a plurality of additional ports and a corresponding plurality of additional tubes, additional collars, and additional seal structures cooperating with the additional ports. The pluralities of additional ports, collars, and tubes may share all or a portion of the structure described hereinabove with respect to the first tube 102, the first collar 110, the first port 120, and the first seal structure 10.1, as desired. The plurality of additional tubes, additional collars, and additional seal structures cooperating with the additional ports may also have the same or different dimensions from the first tube 102, the first collar 110, the first port 120, and the first seal structure 10.1, as desired.

In one particular embodiment, the thermal expansion valve 100 further receives a second tube 202 having a flanged tube end 204. The flanged tube end 204 of the second tube 202 includes a first sealing surface 206 with a first sealing bead 208 formed thereon. A second collar 210 having an outer wall 212 with an opening 214 formed therein is disposed over the second tube 202. The opening 214 receives the flanged tube end 204 of the second tube 202. The flanged tube end 204 of the second tube 202 abuts the wall 212 of the second collar 210. The second collar 210 has an axially extending annular wall 216 surrounding the opening 214 and the flanged tube end 204 of the second tube 202.

The main body 118 includes a second port 220 that receives the second collar 210 and the flanged tube end 204 of the second tube 202. The second port 220 may include a tapered portion 221 that facilitates a piloting of the second collar 210 into the second port 220 during an assembly of the thermal expansion valve 100. The second port 220 has a base 222 with an annular groove 224 formed therein. The annular groove 224 receives the axially extending wall 216 of the second collar 210. The second port 220 also has a second sealing surface 226 with a second sealing bead 228 formed thereon. The second sealing bead 228 is disposed radially inward from the annular groove 224. The second sealing surface 226 surrounds an aperture 230 formed in the base 222 of the second port 220. Like the aperture 130 described hereinabove, the aperture 230 opens to the cavity of the hollow main body 118. It should be appreciated that the aperture 130 and the aperture 230, and the respective first tube 102 and second tube 202, are thereby placed in fluid communication with one another.

The second seal structure 10.2 is disposed radially inward from the axially extending wall 216 of the second collar 210. The second seal structure 10.2 is also disposed between the flanged tube end 204 of the second tube 202 and the hollow main body 118.

The thermal expansion valve 100 of the disclosure further includes a second end plate 232 receiving the second tube 202. The second end plate 232 abuts the wall 212 of the second collar 210 opposite the flanged tube end 204 of the second tube 202. A second fastener 234 engages the second end plate 232 and the main body 118. The second fastener 234 causes the first sealing bead 208 of the second tube 202 and the second sealing bead 228 of the second port 220 to plastically deform the first seal portion 12.2 of the second seal structure 10.2. A primary seal is thereby provided between the flanged tube end 204 of the second tube 202 and the second port 220. The second fastener 234 also causes the first sealing surface 206 of the second tube 202 and the second sealing surface 226 of the second port 220 to cooperate with the second seal portion 14.2 of the second seal structure 10.2. A secondary seal is thereby provided between the second tube 202 and the second port 220. The primary seal and the secondary seal militate against a leakage of a fluid such as refrigerant from the thermal expansion valve 100.

In one embodiment, the main body 118 has a pair of fastener holes 236, the second end plate 232 has a pair of threaded fastener holes 238, and the second fastener 234 includes a pair of threaded bolts. The threaded bolts are disposed through the fastener holes 236 in the main body 118. The threaded bolts cooperate with the threaded fastener holes 238 in the second end plate 232 to urge the second end plate 232 toward the main body 118. In a further example, the fasteners holes 236 in the main body 118 may include recesses that receive heads of the threaded bolts, and permits the first end plate 140 to be disposed thereover without contacting the heads of the threaded bolts. The recesses may also be large enough to permit a torquing of the heads of the threaded bolts therein, and thereby draw the second end plate 232 closer to the main body 118.

The second end plate 232 may have a tube aperture 240 disposed at one end of the second end plate 232 for receiving the second tube 202. The tube aperture 240 may be in the form of a slot formed at the one end of the second end plate 232. Another tube aperture 242, for example, in the form of a hook, may be disposed at another end of the second end plate 232. In the particular embodiment, the second end plate 232 is substantially y-shaped. A skilled artisan may select alternative designs for the second end plate 232, as desired.

Like the relative placement of the first end plate 132 and the main body 118, a gap 235 may also be provided between the main body 118 and the second end plate 232 after the main body 118 and the second end plate 232 are fully engaged and form the primary seal and the secondary seal with the second seal structure 10.2.

Figure 3:
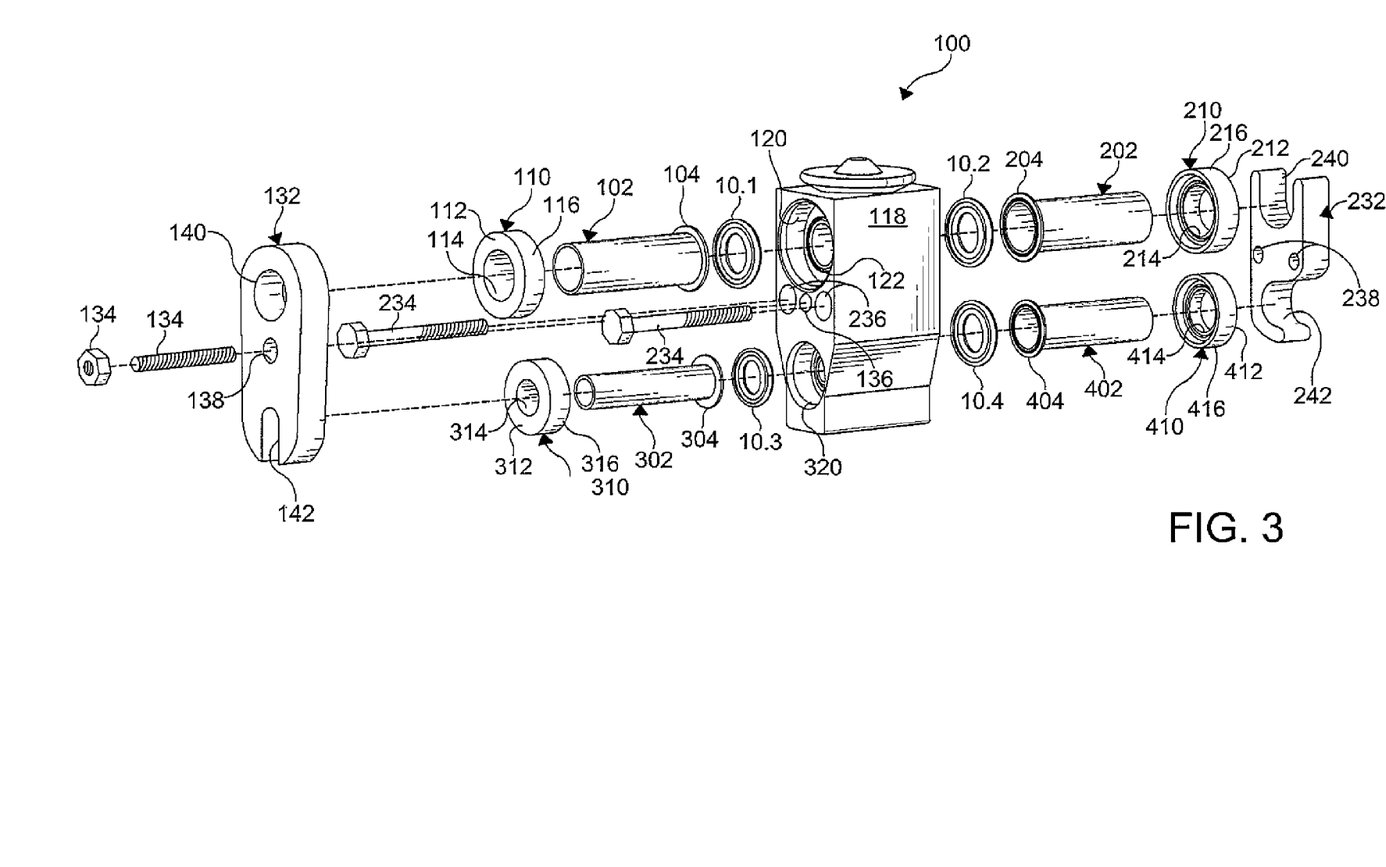
FIG. 3 is an exploded perspective view of a thermal expansion valve with a plurality of the seal structures of FIGS. 1 and 2, according to one embodiment of the present disclosure.
Figure 4:
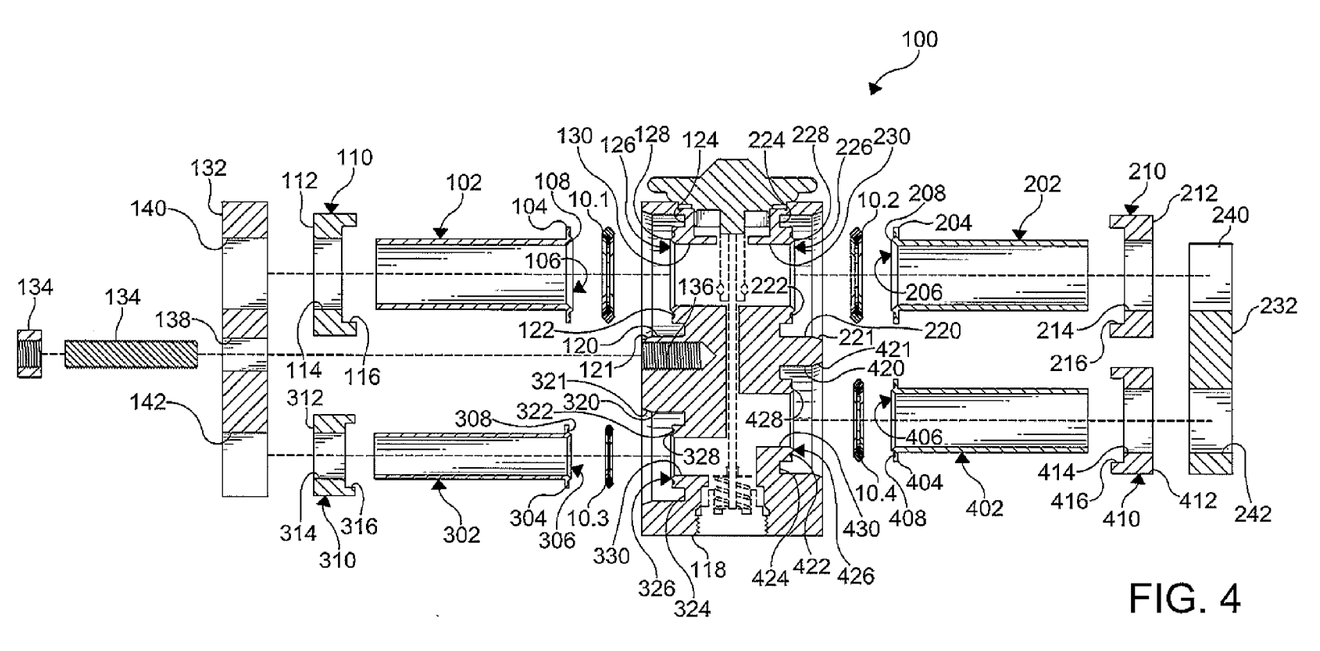
FIG. 4 is an exploded cross-sectional side elevational view of the thermal expansion valve shown in FIG. 3.

With renewed reference to FIGS. 3 and 4, the thermal expansion valve 100 according to a particularly illustrative embodiment is shown. The first tube 102 may be a suction line to a compressor (not shown), and the second tube 202 may be an outlet line from an evaporator (not shown). The thermal expansion valve 100 further receives a third tube 302 having a flanged tube end 304. The third tube 302 is disposed beneath the first tube 102 on a same side of the hollow main body 118 as the first tube 102. The flanged tube end 304 includes a first sealing surface 306 with a first sealing bead 308 formed thereon. The third tube 302 may be a refrigerant inlet line. A fourth tube 402 has a flanged tube end 404 that includes a first sealing surface 406 with a first sealing bead 408 formed thereon. The fourth tube 402 is disposed beneath the second tube 202 and on a same side of the hollow main body 118 as the second tube 202. The fourth tube 402 may be an inlet line to the evaporator.

The thermal expansion valve 100 further includes a third collar 310 and a fourth collar 410. The third collar 310 has an outer wall 312 with an opening 314 formed therein. The opening 314 receives the flanged tube end 304 of the third tube 302. The flanged tube end 304 abuts the wall 312 of the third collar 310. The third collar 310 has an axially extending annular wall 316 surrounding the opening 314 and the flanged tube end 304. The fourth collar 410 has an outer wall 412 with an opening 414 formed therein. The opening 414 receives the flanged tube end 404 of the fourth tube 402. The flanged tube end 404 abuts the wall 412 of the fourth collar 410. The fourth collar 410 has an axially extending annular wall 416 surrounding the opening 414 and the flanged tube end 404.

The hollow main body 118 further includes a third port 320 receiving the third collar 310 and the flanged tube end 304 of the third tube 302. The third port 320 may include a tapered portion 321 that facilitates a piloting of the third collar 310 into the third port 320 during an assembly of the thermal expansion valve 100. The hollow main body 118 also includes a fourth port 420 receiving the fourth collar 410 and the flanged tube end 404 of the fourth tube 402. The fourth port 420 may include a tapered portion 421 that facilitates a piloting of the fourth collar 410 into the fourth port 420 during an assembly of the thermal expansion valve 100. Like the first and second ports 120, 220 described hereinabove, each of the third port 320 and fourth port 420 having a base 322, 422 with an annular groove 324, 424 formed therein. The annular groove 324 of the third port 320 receives the axially extending wall 316 of the third collar 310. The annular groove 424 of the fourth port 420 receives the axially extending wall 416 of the fourth collar 410. Each of the third port 320 and the fourth port 420 have a second sealing surface 326, 426 with a second sealing bead 328, 428 formed thereon. The second sealing beads 328, 428 are each disposed radially inward from the respective annular groove 324, 424. The second sealing surfaces 326, 426 each surround an aperture 330, 430 formed in the base 322, 422 of the third port 320 and the fourth port 420, respectively.

The third seal structure 10.3 is disposed radially inward from the axially extending wall 316 of the third collar 310 and between the flanged tube end 304 of the third tube 302 and the hollow main body 118. The fourth seal structure 10.4 is disposed radially inward from the axially extending wall 416 of the fourth collar 410 and between the flanged tube end 404 of the fourth tube 402 and the hollow main body 118. The first end plate 132 receives the first tube 102 in the tube aperture 140 and the third tube 302 in the tube aperture 142. The first end plate 132 abuts the wall 112 of the first collar 110 opposite the flanged tube end 104 of the first tube 102. The first end plate 132 also abuts the wall 312 of the third collar 310 opposite the flanged tube end 304 of the third tube 302

The second end plate 232 receives the second tube 202 in the tube aperture 240 and the fourth tube 402 in the tube aperture 242. The second end plate 232 abuts the wall 212 of the second collar 210 opposite the flanged tube end 204 of the second tube 202. The second end plate 232 also abuts the wall 412 of the fourth collar 410 opposite the flanged tube end 404 of the fourth tube 402.

As with the first and second sealing beads 108, 128, 208, 228 described hereinabove, the first fastener 134 also causes the first sealing bead 308 of the third tube 302 and the second sealing bead 328 of the third port 320 to plastically deform the first seal portion 12.3 of the third seal structure 10.3 and provide a primary seal therebetween. The first fastener 134 likewise causes the first sealing surface 306 of the third tube 302 and the second sealing surface 326 of the third port 320 to cooperate with the second seal portion 14.3 of the third seal structure 10.3 and provide a secondary seal between the third tube 302 and the third port 320 of the hollow main body 118.

The second fastener 234 causes the first sealing bead 408 of the fourth tube 402 and the second sealing bead 428 of the fourth port 420 to plastically deform the first seal portion 12.4 of the fourth seal structure 10.4. A primary seal is thereby provided between the fourth tube 402 and the fourth port 420. The second fastener 234 also causes the first sealing surface 406 of the fourth tube 402 and the second sealing surface 426 of the fourth port 420 to cooperate with the second seal portion 14.4 of the fourth seal structure 10.4, and provide a secondary seal therebetween. The primary seals and the secondary seals advantageously militate against a leakage of refrigerant from the thermal expansion valve 100.

It should be understood that each of the first collar 110, the second collar 210, the third collar 310, and the fourth collar 410 may be provided as a separate component or formed integrally with one of the first end plate 132 and the second end plate 232, as desired. With reference to an exemplary embodiment illustrated in FIG. 7, the first collar 110 may be integral with the first end plate 132 and the second collar 210 may be integral with the second end plate 232. Other integrations of the various components of the thermal expansion valve 100 are also within the scope of the present disclosure.

In one particular example, the sealing pressure from the first and second end plates 132, 232 may be applied at a reduced torque from about 15 Nm to about 8 Nm. The torque is reduced in comparison to sealing loads on conventional thermal expansion valves. The reduced torque may facilitate a proper sealing of the seal structures 10.1, 10.2, 10.3, 10.4 without over stressing the first and second seal portions 12.1, 12.2, 12.3, 12.4, 14.1, 14.2, 14.3, 14.4. The reduced torque may also be desirable for militating against a twisting of the main body 118 without the need of additional brackets, thereby minimizing manufacturing complexity.

One of ordinary skill in the art should understand that use of the seal structures 10.1, 10.2, 10.3, 10.4 in the multi-port device configuration, such as described herein, advantageously minimizes an opportunity for leakage from the multi-port device. The first and second end plates 132, 232 for clamping the first, second, third, and fourth collars 110, 210, 310, 410 to the hollow main body 118 provide for a balanced sealing load across all of the seal structures 10.1, 10.2, 10.3, 10.4. The optional integration of at least a portion the first, second, third, and fourth collars 110, 210, 310, 410 with the first and second end plates 132, 232 can also be used to reduce complexity, and improve the assembly process.

While certain representative embodiments and details have been shown for purposes of illustrating the invention, it will be apparent to those skilled in the art that various changes may be made without departing from the scope of the disclosure, which is further described in the following appended claims.

What is claimed is:

1. A multi-port device for an air conditioning system comprising:
    a first tube having a flanged tube end, the flanged tube end including a first sealing surface with a first sealing bead formed thereon;
    a first collar having an outer wall with an opening formed therein, the opening receiving the first tube, the flanged tube end abutting the wall of the first collar, the first collar having an axially extending annular wall surrounding the opening and the flanged tube end;
    a hollow main body including a first port receiving the first collar and the tube end of the first tube, the first port having a base with an annular groove formed therein, the annular groove receiving the axially extending annular wall of the first collar, the first port having a second sealing surface with a second sealing bead formed thereon radially inward from the annular groove, the second sealing surface surrounding an aperture formed in the base of the first port;
    a first seal structure disposed radially inward from the axially extending annular wall of the first collar and between the flanged tube end of the first tube and the main body, the first seal structure including a first seal portion produced from a plastically deformable metal or plastic material and having a free edge, and a second seal portion produced from an elastomer disposed on the free edge of the first seal portion, wherein the first seal structure abuts the axially extending annular wall of the first collar, the flanged tube end of the first tube, and the main body;
    a first end plate receiving the first tube and abutting the wall of the first collar opposite the flanged tube end; and
    a first fastener engaging the first end plate and the main body, the first fastener causing the first sealing bead of the first tube and the second sealing bead of the first port to plastically deform the first seal portion of the first seal structure and provide a primary seal between the first tube and the first port, and the first fastener causing the first sealing surface of the first tube and the second sealing surface of the first port to cooperate with the second seal portion of the first seal structure and provide a secondary seal between the first tube and the first port, wherein the primary seal and the secondary seal militate against a leakage of a fluid from the multi-port device.

2. The multi-port device of claim 1, wherein each of the first sealing bead and the second sealing bead is substantially V-shaped in cross-section.

3. The multi-port device of claim 1, wherein the main body has a threaded fastener hole, the first end plate has a fastener hole, and the first fastener includes a threaded stud, the threaded stud cooperating with the threaded fastener hole in the main body and disposed through the fastener hole in the first end plate, and the first fastener further includes a nut cooperating with the threaded stud to urge the first end plate toward the main body.

4. The multi-port device of claim 1, wherein the first end plate has a tube aperture disposed at one end of the first end plate for receiving the first tube, and another tube aperture disposed at another end of the first end plate.

5. The multi-port device of claim 1, wherein the first sealing surface of the flanged tube end includes an annular channel formed radially outward from the first sealing bead.

6. The multi-port device of claim 1, wherein a gap is present between the main body and the first end plate after the main body and the first end plate are fully engaged and form the primary seal and the secondary seal with the first seal structure.

7. The multi-port device of claim 1, wherein the first collar is integral with the first end plate.

8. The multi-port device of claim 1, further comprising:
    a second tube having a flanged tube end, the flanged tube end including a first sealing surface with a first sealing bead formed thereon;
    a second collar having a wall with an opening formed therein, the opening receiving the second tube, the flanged tube end of the second tube abutting the wall of the second collar, the second collar having an axially extending annular wall surrounding the opening and the flanged tube end of the second tube; and
    a second seal structure disposed radially inward from the axially extending annular wall of the second collar and between the flanged tube end of the second tube and the main body, the second seal structure including a first seal portion produced from a plastically deformable metal or plastic material and having a free edge, and a second seal portion produced from an elastomer disposed on the free edge of the first seal portion,
    wherein the main body includes a second port receiving the second collar and the tube end of the second tube, the second port having a base with an annular groove formed therein, the annular groove receiving the axially extending annular wall of the second collar, the second port having a second sealing surface with a second sealing bead formed thereon radially inward from the annular groove, the second sealing surface surrounding an aperture formed in the base of the second port.

9. The multi-port device of claim 8, further comprising:
    a second end plate receiving the second tube and abutting the wall of the second collar opposite the flanged tube end of the second tube; and
    a second fastener engaging the second end plate and the main body, the second fastener causing the first sealing bead of the second tube and the second sealing bead of the second port to plastically deform the first seal portion of the second seal structure and provide a primary seal between the flanged tube end and the second port, and the second fastener causing the first sealing surface of the second tube and the second sealing surface of the second port to cooperate with the second seal portion of the second seal structure and provide a secondary seal between the second tube and the second port, wherein the primary seal and the secondary seal militate against a leakage of a fluid from the multi-port device.

10. The multi-port device of claim 9, wherein the main body has a pair of fastener holes, the second end plate has a pair of threaded fastener holes, and the second fastener includes a pair of threaded bolts, the threaded bolts disposed through the fastener holes in the main body and cooperating with the threaded fastener holes in the second end plate to urge the second end plate toward the main body.

11. The multi-port device of claim 10, wherein the fastener holes in the main body include a recess that receives a head of one of the threaded bolts and permits the first end plate to be disposed thereover.

12. The multi-port device of claim 9, wherein the second end plate has a tube aperture disposed at one end of the second end plate for receiving the second tube, and another tube aperture disposed at another end of the second end plate.

13. The multi-port device of claim 9, wherein the second end plate is substantially y-shaped.

14. The multi-port device of claim 9, wherein a gap is present between the main body and the second end plate after the main body and the second end plate are fully engaged and form the primary seal and the secondary seal with the second seal structure.

15. The multi-port device of claim 9, wherein the second collar is integral with the second end plate.

16. The multi-port device of claim 1, wherein each of the first sealing bead and the second sealing bead impinge opposing first and second surfaces of the first seal portion of the first seal structure to a depth of up to about thirty percent (30%) of a maximum thickness of the first seal portion.

17. The multi-port device of claim 1, wherein the first port includes a tapered portion that facilitates a piloting of the first collar into the first port during an assembly of the multi-port device.

18. A thermal expansion valve for an air conditioning system comprising:
a plurality of tubes, each of the tubes having a flanged tube end, the flanged tube end including a first sealing surface with a first sealing bead formed thereon;
a plurality of collars, each of the collars having an outer wall with an opening formed therein, the opening receiving one of the tubes, the flanged tube end abutting the wall of one of the collars, each of the collar having an axially extending annular wall surrounding the opening and the flanged tube end;
a hollow main body including a plurality of ports, each of the ports receiving one of the collars and the tube end of one of the tubes, the ports each having a base with an annular groove formed therein, the annular groove receiving the axially extending annular wall of one of the collars, each of the ports having a second sealing surface with a second sealing bead formed thereon and disposed radially inward from the annular groove, the second sealing surface surrounding an aperture formed in the base of the first port;
a plurality of seal structures, each of the seal structures disposed radially inward from the axially extending annular wall of one of the collars and between the flanged tube end of the one of the tubes and the main body, each seal structure including a first seal portion produced from a plastically deformable metal or plastic material and having a free edge, and a second seal portion produced from an elastomer disposed on the free edge of the first seal portion, wherein at least one of the seal structures abuts the axially extending annular wall of one of the collars, the flanged tube end of one of the tubes, and the main body;
a pair of end plates having the main body disposed therebetween, each of the end plates receiving at least one of the tubes and abutting the wall of the of one of the collars opposite the flanged tube end; and
a plurality of fasteners engaging the end plates and the main body, the fasteners causing the first sealing beads of the tubes and the second sealing beads of the ports to plastically deform the first seal portions of the seal structures and provide primary seals between the tubes and the ports, and the fasteners causing the first sealing surface of the tubes and the second sealing surface of the first port to cooperate with the second seal portions of the seal structures and provide secondary seals between the tubes and the ports, wherein the primary seals and the secondary seals militate against a leakage of refrigerant from the thermal expansion valve.

19. A thermal expansion valve for an air conditioning system comprising:
a first tube having a flanged tube end, the flanged tube end including a first sealing surface with a first sealing bead formed thereon, wherein the first tube is a suction line to a compressor;
a second tube having a flanged tube end, the flanged tube end including a first sealing surface with a first sealing bead formed thereon, wherein the second tube is an outlet line from an evaporator;
a third tube having a flanged tube end, the flanged tube end including a first sealing surface with a first sealing bead formed thereon, wherein the third tube is a refrigerant inlet line;
a fourth tube having a flanged tube end, the flanged tube end including a first sealing surface with a first sealing bead formed thereon, wherein the fourth tube is an inlet line to the evaporator;
a first collar having an outer wall with an opening formed therein, the opening receiving the first tube, the flanged tube end abutting the wall of the first collar, the first collar having an axially extending annular wall surrounding the opening and the flanged tube end;
a second collar having an outer wall with an opening formed therein, the opening receiving the second tube, the flanged tube end abutting the wall of the second collar, the second collar having an axially extending annular wall surrounding the opening and the flanged tube end;
a third collar having an outer wall with an opening formed therein, the opening receiving the third tube, the flanged tube end abutting the wall of the third collar, the third collar having an axially extending annular wall surrounding the opening and the flanged tube end;
a fourth collar having an outer wall with an opening formed therein, the opening receiving the fourth tube, the flanged tube end abutting the wall of the fourth collar, the fourth collar having an axially extending annular wall surrounding the opening and the flanged tube end;
a hollow main body including a first port receiving the first collar and the tube end of the first tube, a second port receiving the second collar and the tube end of the second tube, a third port receiving the third collar and the tube end of the third tube, and a fourth port receiving the fourth collar and the tube end of the fourth tube, each of the first port, the second port, the third port and fourth port having a base with an annular groove disposed therein, the annular groove of the first port cooperating with the axially extending annular wall of the first collar, the annular groove of the second port cooperating with the axially extending annular wall of the second collar, the annular groove of the third port cooperating with the axially extending annular wall of the third collar, and the annular groove of the fourth port cooperating with the axially extending annular wall of the fourth collar, each of the first port, the second port, the third port, and the fourth port having a second sealing surface with a second sealing bead formed thereon and disposed radially inward from the annular groove, the second sealing surface surrounding an aperture formed in the base of each of the first port, the second port, the third port, and the fourth port;

a first seal structure disposed radially inward from the axially extending annular wall of the first collar and between the flanged tube end of the first tube and the main body, the first seal structure including a first seal portion produced from a plastically deformable metal or plastic material and having a free edge, and a second seal portion produced from an elastomer disposed on the free edge of the first seal portion;

a second seal structure disposed radially inward from the axially extending annular wall of the second collar and between the flanged tube end of the second tube and the main body, the second seal structure including a first seal portion produced from a plastically deformable metal or plastic material and having a free edge, and a second seal portion produced from an elastomer disposed on the free edge of the first seal portion;

a third seal structure disposed radially inward from the axially extending annular wall of the third collar and between the flanged tube end of the third tube and the main body, the third seal structure including a first seal portion produced from a plastically deformable metal or plastic material and having a free edge, and a second seal portion produced from an elastomer disposed on the free edge of the first seal portion;

a fourth seal structure disposed radially inward from the axially extending annular wall of the fourth collar and between the flanged tube end of the fourth tube and the main body, the fourth seal structure including a first seal portion produced from a plastically deformable metal or plastic material and having a free edge, and a second seal portion produced from an elastomer disposed on the free edge of the first seal portion, wherein at least one of the seal structures abuts the axially extending annular wall of the respective one of the collars, the flanged tube end of the respective one of the tubes, and the main body;

a first end plate receiving the first tube and the third tube, and abutting the wall of the first collar opposite the flanged tube end of the first tube and the wall of the third collar opposite the flanged tube end of the third tube; and a second end plate receiving the second tube and the fourth tube, and abutting the wall of the second collar opposite the flanged tube end of the second tube and the wall of the fourth collar opposite the flanged tube end of the fourth tube;

a first fastener engaging the first end plate and the main body, the first fastener causing the first sealing bead of the first tube and the second sealing bead of the first port to plastically deform the first seal portion of the first seal structure and provide a primary seal between the first tube and the first port, and the first fastener causing the first sealing surface of the first tube and the second sealing surface of the first port to cooperate with the second seal portion of the first seal structure and provide a secondary seal between the first tube and the first port, and the first fastener causing the first sealing bead of the third tube and the second sealing bead of the third port to plastically deform the first seal portion of the third seal structure and provide a primary seal between the third tube and the third port, and the first fastener causing the first sealing surface of the third tube and the second sealing surface of the third port to cooperate with the second seal portion of the third seal structure and provide a secondary seal between the third tube and the third port; and a second fastener engaging the second end plate and the main body, the second fastener causing the first sealing bead of the second tube and the second sealing bead of the second port to plastically deform the first seal portion of the second seal structure and provide a primary seal between the second tube and the second port, and the second fastener causing the first sealing surface of the second tube and the second sealing surface of the second port to cooperate with the second seal portion of the second seal structure and provide a secondary seal between the second tube and the second port, and the second fastener causing the first sealing bead of the fourth tube and the second sealing bead of the fourth port to plastically deform the first seal portion of the fourth seal structure and provide a primary seal between the fourth tube and the fourth port, and the second fastener causing the first sealing surface of the fourth tube and the second sealing surface of the fourth port to cooperate with the second seal portion of the fourth seal structure and provide a secondary seal between the fourth tube and the fourth port, wherein the primary seals and the secondary seals militate against a leakage of refrigerant from the thermal expansion valve.

20. The thermal expansion valve of claim 19, wherein the first collar is integral with the first end plate and the second collar is integral with the second end plate.

* * * * *